United States Patent [19]

Loumos et al.

[11] Patent Number: 5,157,638
[45] Date of Patent: Oct. 20, 1992

[54] METHOD OF DERIVING STATICS CORRECTIONS FROM COMMON REFLECTION POINT GATHERS

[75] Inventors: Gregory L. Loumos; Shein S. Wang; Thomas R. Stoeckley, all of Ponca City, Okla.

[73] Assignee: Conoco Inc., Ponca City, Okla.

[21] Appl. No.: 819,894

[22] Filed: Jan. 13, 1992

[51] Int. Cl.$^5$ .............................................. G01V 1/36
[52] U.S. Cl. ......................................... 367/54; 367/50
[58] Field of Search ........................ 367/38, 50, 51, 52, 367/53, 54, 36; 364/421

[56] References Cited

U.S. PATENT DOCUMENTS

| | | | |
|---|---|---|---|
| 4,592,032 | 5/1986 | Ruckgaber | 367/73 |
| 4,839,869 | 6/1989 | Corcoran | 367/53 |
| 4,894,809 | 1/1990 | Moeckel | 367/57 |
| 4,907,205 | 3/1990 | Yanchak | 367/52 |
| 4,935,904 | 6/1990 | Chambers et al. | 367/38 |
| 4,980,866 | 12/1990 | Wang et al. | 367/52 |
| 5,050,131 | 9/1991 | Wang et al. | 367/73 |

Primary Examiner—Ian J. Lobo

[57] ABSTRACT

A method for static correction includes a three step process which eliminates the problems of assuming hyperbolic moveout curves and forming base traces from common midpoint gathers while addressing long spatial wavelength variations. First, after calculating and applying an approximate high-frequency static correction to the individual shot and receivers (using traditional automatic methods), depth migration iterations are employed to coarsely tune the near-surface velocity layer. Second, after applying this correction, the remaining statics are incorporated into the model by tomography, which accounts for the velocity and thickness of the weathering layer and buried anomalies. Third, any residual misalignments are addressed using a multi-windowed statics adjustment within the common image point (CIP) gathers.

20 Claims, 3 Drawing Sheets

METHOD OF DERIVING STATICS CORRECTIONS FROM COMMON REFLECTION POINT GATHERS

BACKGROUND OF THE INVENTION

1. Field of the Invention

The present invention relates to methods for processing seismic data and more particularly to a method that provides a set of source and receiver statics corrections suitable for improving depth image.

2. Related Prior Art

Tomography has been used to modify velocity models. Time domain statics solutions are known to improve stacking in the time domain. However, prior art has not thought about solving the problem at the reflection point, where the solution is rigorously correct. The following patents are examples of prior art attempts at addressing this problem.

U.S. Pat. No. 4,592,032 titled "Methods of Processing Geophysical Data and Displays of Geophysical Data", issued to Gary M. Ruckgaber, relates to a seismic signal processing method in which seismic signals are processed to determine relative location error. The relative location errors are corrected and the corrected seismic signals are processed to give information on subsurface structure.

U.S. Pat. No. 4,839,869 titled "Methods for Processing Converted Wave Seismic Data" issued to Chris T. Corcoran, relates to methods for processing converted wave seismic data. This includes fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

U.S. Pat. No. 4,894,809 titled "Method for Bin, Moveout Correction and Stack of Offset Vertical Seismic Profile Data in Media with Dip" issued to George P. Moeckel, relates to processing vertical seismic profile data. Seismic energy is generated at a multiplicity of source offsets from a borehole and offset VSP data is collected by an acoustic detector at a multiplicity of geophone depths for each source offset. The recorded data is sorted into Zero Source-Receiver (ZSR), common reflection point bins. Data from each offset VSP, ZSR common reflection point gather are dynamically moveout corrected with data adaptive parameters including reduced direct arrival times, dip, borehole deviation and stacking velocities. The moveout corrected VSP data are then stacked.

U.S. Pat. No. 4,907,205 titled "Method for Attenuating Multiple Reflection Events in Seismic Data", issued to Dennis A. Yanchak, relates to a method for enhancing seismic data and, more particularly, for attenuating multiple reflection events in seismic data. Seismic data are sorted into common endpoint gathers, and selected multiple reflection events are corrected for time delays associated with the reflection of the seismic entry from common reflection interfaces and aligned. The aligned multiple reflection events are attenuated and the resulting enhanced seismic data can then be inverse time delay corrected for subsequent processing, including repetitions of the aligning and attenuation steps to suppress additional multiple reflection events in the seismic data.

U.S. Pat. No. 4,935,904 titled "Method for Suppressing Coherent Noise in Seismic Data", issued to Ronald E. Chambers, et al., relates to a method for removing boundary-generated artifacts in synthetic and actual seismic data. After seismic data processing, undesirable boundary-generated artifacts appear in the final seismic section. To remove this unwanted noise from section, zeros are added to the lower boundary of the seismic section. This essentially pushes the sources of the noise downward in time in the section. After padding with zeros, the seismic data is collapsed to the point sources of origin using the Stolt migration/diffraction algorithm. Once the data are collapsed, the size of the seismic section is reduced to its original size. Following the resizing of the section, the inverse of the earlier applied Stolt algorithm is applied to return the seismic data to its original form, minus the boundary-generated artifacts.

U.S. Pat. No. 4,980,866 titled "Common Offset Depth Migration with Residual Moveout Correction", issued to Shein S. Wang et al. relates to a method for applying residual moveout correction to common offset depth migrated data. Common offset depth migration is applied using the best available velocity/depth model. Post migrated parts, which are depth migrated common midpoint gathers, are saved. The post migrated parts are treated as if they were in time not depth. Normal moveout based on a constant velocity is removed. Velocity functions (time-velocity pairs) are derived for the post migrated parts with normal moveout removed using a standard velocity analysis program. Normal moveout based on these velocity functions is applied. The events on the post migrated parts are now imaged to the same depth. The corrected post migrated parts are then stacked and displayed.

U.S. Pat. No. 5,050,131 titled "Quantitative Method for Evaluating Velocity Model Quality", issued to Shein S. Wang et al., relates to a method for quantitatively determining an accurate subsurface velocity prior to data migration. This method includes steps whereby the accuracy of the velocity can be defined by measuring the deviation in depth as a function of offset in the common reflection point (CRP) gather. A point on reflector is selected and the CRP gather is formed. If the image is not flat, the velocity is adjusted until it is flat. The velocity is decreased and the far offset end of the image will be imaged to shallower depth than the near offset end. The velocity is increased and the image will tilt down at the far offset end. An error is defined which is the theoretical accuracy limit for the determination of velocity using the CRP method. A factor is defined that indicates the reliability of the image for a reflector.

SUMMARY OF THE INVENTION

A method for static correction includes a three step process which eliminates the problems of assuming hyperbolic moveout curves and forming base traces from common midpoint gathers while addressing long spatial wavelength variations. First, after calculating and applying an approximate high-frequency static correction to the individual shot and receivers (using traditional automatic methods), depth migration iterations are employed to coarsely tune the near-surface velocity layer. Second, after applying this correction, the remaining statics are modeled by tomography, which accounts for the velocity and thickness of the weathering layer and buried anomalies. Third, any residual misalignments are addressed using a multi-windowed statics adjustment within the common image point (CIP) gathers.

The present invention relates to a method of deriving statics corrections from seismic data including common reflection point gathers and both unmigrated and migrated traces which includes the following steps. Seismic data are received as unmigrated gathers having traces with headers containing a conventional statics solution which has a range of short and long spatial wavelength components. The conventional statics solution for source and receiver are extracted and filtered to remove all but the shortest wavelength (highest frequency) set of components. These components are applied to their respective shots and receivers of the shot-gathered unmigrated traces having no static corrections. A pre-stack depth migration is performed using a uniform weathering velocity on these unmigrated traces. An initial stacking power of each gather is calculated by stacking all the traces in the gather. Source and receiver locations of each depth migrated trace of the gathers is recorded on a source list and receiver list. The source list and the receiver list are sorted in order. A source location is selected for further processing. The uniform weathering velocity of said predetermined source is changed incrementally by dv. The stacking powers of all the gathers is combined to provide a total stacking power. A velocity increment dv is chosen to maximize the total stacking power. A second predetermined source location can be selected for further processing. The uniform weathering velocity of the second predetermined source is changed incrementally by dv. The stacking power of all the gathers are combined to provide a second total stacking power. A velocity increment dv is chosen to maximize the second total stacking power. This procedure is continued until all the selected sources have been addressed. Next, a receiver location is chosen for further processing. The uniform weathering velocity of the predetermined receiver is changed incrementally by dv. The stacking power of all the gathers is combined to provide yet another total stacking power. A velocity increment dv is chosen to maximize this new total stacking power. A second predetermined receiver location is selected for further processing. The uniform weathering velocity of the second predetermined receiver is changed incrementally by dv. The stacking power of all gathers is combined to provide another total stacking power. A velocity increment dv is chosen to maximize this total stacking power. This procedure is continued until all the selected sources have been addressed. The source and receiver weathering velocities modified by their individually determined dv's are averaged and graded to yield a single velocity profile having a new weathering velocity. The depth model is then updated with this new velocity profile. Tomography is employed to refine the near surface layers. Once an acceptable model of the weathering and buried anomalies has been derived, the unmigrated traces are depth migrated using the new velocities. Existing methods for improving the deeper portions of the velocity depth model can be employed to optimize the depth migration. The resulting common image point (CIP) traces are then treated with a conventional multi-window trim statics method to remove any residual shifts that remain in the data. Finally, the CIP gathers are stacked for output of the improved depth migrated section.

DESCRIPTION OF THE PREFERRED EMBODIMENT

The present invention provides a method of deriving statics corrections from common reflection point gathers.

Currently, statics are derived from seismic time traces by correlation methods. There can be four problems. First, the methods implicitly assume hyperbolic moveout curves, which is a poor assumption in complex areas. Second, the common midpoint (CMP) assumption, i.e. that rays are reflected from a common point midway between the source and receiver, breaks down in complex areas. Attempting to form base traces from common midpoint gathers could be inappropriate. Third, automatic statics are generally weak in addressing long period or buried anomalies. Fourth, the same shift (correction) is generally applied to the whole trace, meaning shallower events and deeper events are time shifted by the same amount, which can be a poor assumption.

The method of the present invention eliminates these problems by examining the data through the common reflection point (CRP) gather, where traces have been depth migrated to their true reflection point. As for the last problem, when statics are due to weathering, the correction to the depth trace is at shallow depth, so the same correction is expected to hold for events at all depths. This means that this static correction can be derived by matching one or several depth events. Deeper statics are addressed by the tomography step.

A three step method is proposed by the present invention. First, after calculating and applying an approximate high-frequency static correction to the individual shots and receivers (using traditional automatic methods), depth migration iterations on specified events are employed to coarsely define the near surface velocity layer. Second, after applying this correction, the remaining statics are modeled through tomography, which accounts for the velocity and thickness of the weathering layer and buried anomalies. Third, any residual misalignments are addressed using a multi-windowed statics adjustment within the common image point (CIP) gathers, i.e., those traces resulting from an (all event) common offset depth migration.

The present invention uses this method with two dimensional seismic land data in mind, but there is no reason why it cannot be applied to marine data if a similar situation arises. The method of the present invention can also be generalized to three dimensions easily.

The proposed method of the present invention includes three basic steps, coarse calculation of the statics via iterative depth migrations, fine tuning the statics model via tomography and trimming the residuals via multi-window adjustments.

Figure 2:
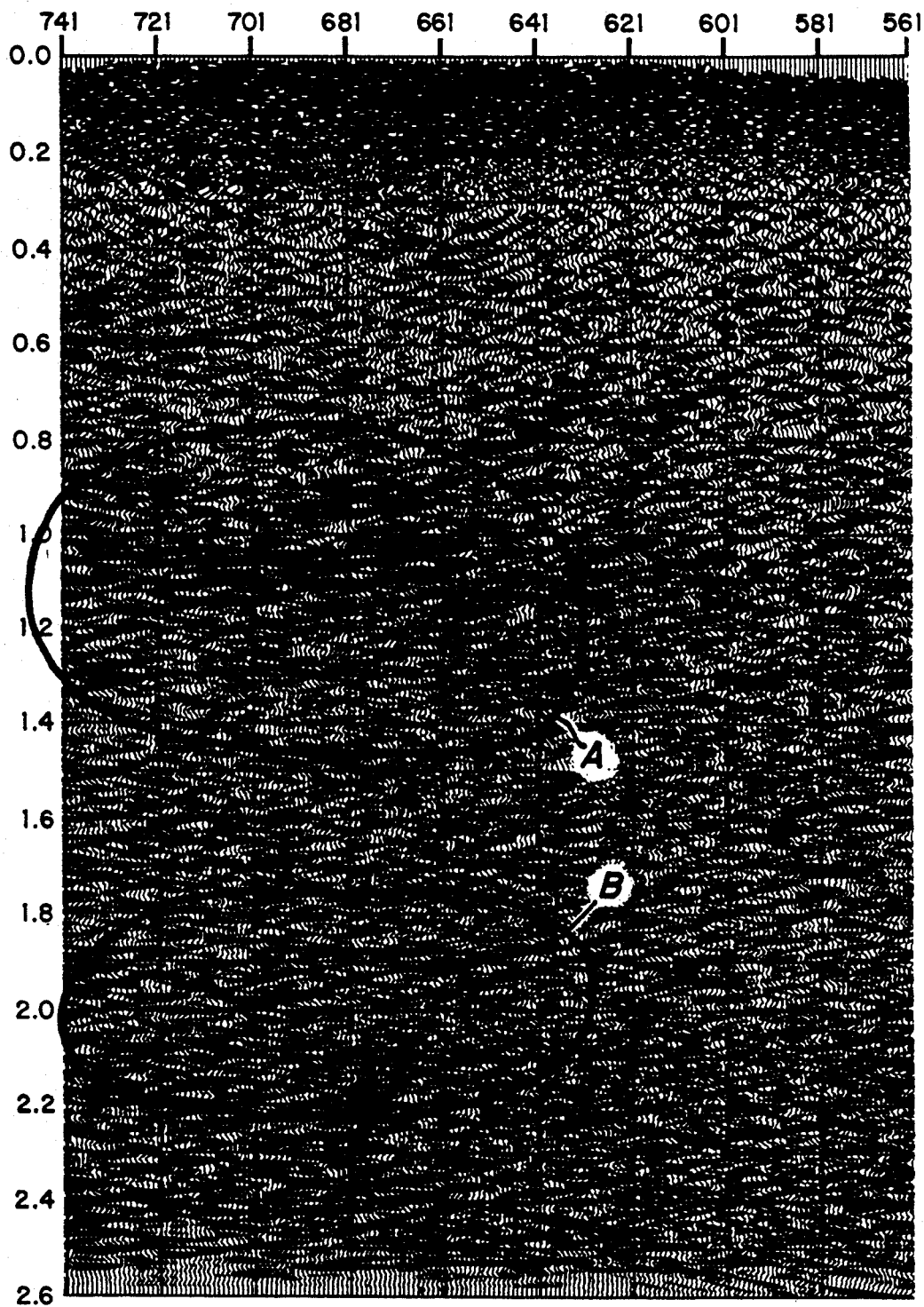
FIG. 2 is a seismogram illustrating a migrated depth section for a typical land line.

The first step, source and receiver statics calculation, concerns several steps. FIG. 2 illustrates a migrated depth section for a typical land line. The velocity model used in generating this depth section will be referred to as the initial model. Referring to FIG. 2, several events in areas A and B, which have been identified by circling, are suitable for use in the application of the method of the present invention.

The best event is selected first. For each trace containing this event, a common reflection point gather is assembled using the dip and the depth derived from the event and ray tracing through the initial model. In all, there are N gathers, one for each stacked trace of the event. For example, the left most event can be picked from trace numbers 576 to 731. Thus 156 gathers can be generated.

Each trace of this gather is a particular input trace, depth migrated to this proposed reflection point. It obeys Snell's law from its source point to the reflection point then back to the receiver point with respect to the model. Thus, the ray path is known when this trace is selected.

All together, if there are on average M traces for every common reflection point gather, a total of N×M traces are selected. The individual source and receiver statics are computed by maximizing the "stacking power" of each gather by the following steps.

Figure 1:
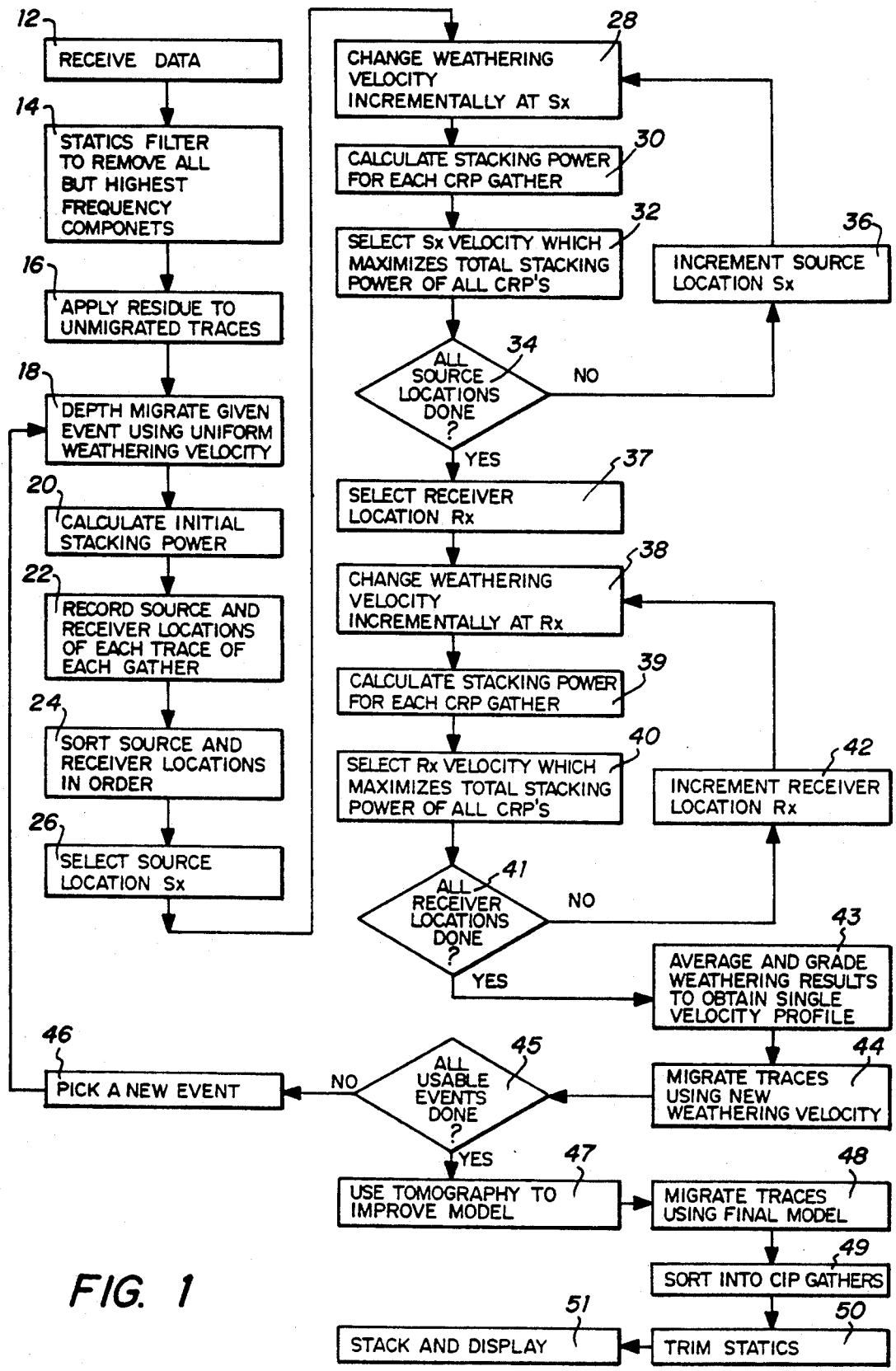
FIG. 1 is a flow chart illustrating the method of the present invention in block form.

Referring now to FIG. 1, a flow chart of the method of the present invention is illustrated in block form. At block 12 the seismic data is received. This data may take the form of any data currently in use in the art.

At block 14 the conventional statics solution for source and receiver is filtered to remove all but the highest frequency component that one would want to depth model, corresponding to about ten ground positions. This residue is applied to the unmigrated traces at block 16.

At block 18 a depth migration using a uniform weathering velocity is performed. An assumption is made that the intermediate and long period weathering can be represented by velocity variations within a single layer having a thickness corresponding to the wavelength of the lowest frequency in the ground (for example, 200 feet for 5 Hz in a 1000 ft/sec region). The initial stacking power of each gather is calculated at block 20 by stacking all traces in the gather.

At block 22 the source and receiver location of each trace of each gather are recorded on a source list and receiver list. Each is sorted in order at block 24.

At block 26 a particular source location $S_x$ is selected for further processing. At block 28 the "weathering velocity" of this source is changed incrementally by dv. All the traces with this source location will be shifted by an amount computed using the corresponding ray path. While the traces are shifted, the stacking power of the corresponding CRP gather for which this trace is a member will also change.

At block 30 the stacking power of all the CRP gathers is combined or summed. At block 32 the velocity increment dv is chosen to maximize the total stacking power of all the CRP's.

At block 34 whether the last desired source location has been used is checked. If it has not, the source location number is incremented by a predetermined number at block 36 and the program returns to block 28 to repeat steps 28, 30 and 32 for a new source location. If the last source location has been reached, the program proceeds to block 37 where a particular receiver location $R_x$ is selected for further processing. At block 38 the "weathering velocity" of this receiver is changed incrementally by dv. All traces with this receiver location are incremented by a predetermined number. The program proceeds to blocks 39 and 40 (which are the receiver analog of the source specific blocks 30 and 32).

At block 41 whether the last desired receiver location has been used is checked. If it has not, the receiver location is incremented by a predetermined number at block 42 and the program returns to block 38 to repeat steps 38, 39 and 40 for the new receiver location. If the last receiver location has been reached, the program proceeds to block 43 where the weathering results for the sources and receivers are averaged and graded to yield a single velocity profile.

After working with one event, the source and receiver statics have been computed to sharpen this particular event. Since the same source and receiver are also involved in the other traces, the depth migration can be corrected using this partial list. At block 44 traces ma be migrated using the new weathering velocity. The result of this migration (using the same initial model, but partially improved source and receiver static) should improve not only the image of the picked event, but the neighboring event as well. In other words, the neighboring events should now be easier to assess.

At block 45 a check is made as to whether all events of interest have been used. If the last event has not been used, another event is chosen at block 46 and a depth migration for this event is performed at block 18. This new migration generates a new set of CRP's, which are treated as outlined earlier. In this way refinements to the source and receiver statics may be calculated. If the last event has been used, the method proceeds to the next step.

The second step of the method of the present invention uses tomography to refine the depth model. At block 47 the unmigrated traces are analyzed by a tomographic method having as its starting point the velocity depth model corrected for statics, as outlined in the first step. Through this treatment, modifications are made to the model to make it better conform to the data. Previously unresolved statics arising from the weathering layer or deeper anomalies are addressed. The use of a well chosen preliminary model allows the tomography to converge more quickly and with a better likelihood of accuracy. The output of block 47 is an improved depth model to be used in the final depth migration, which occurs at block 48.

In the third step of the method of the present invention trimming statics from multi-window adjustments is done to correct for the small inaccuracies in the previous processes. At block 49 the results of common offset depth migration is sorted into common image point (CIP) gathers. Each common image point gather is then handled as a common depth point (CDP) gather. At block 50 a basement-consistent multi-windowed statics program, such as commonly used in the art, can be used to derive a set of adjustments optimizing the event lineups and, therefore, yield a better stack. If the residual moveout is too severe to allow a well-behaved adaptive treatment, a preliminary hyperbolic correction can be employed. This portion of the present invention is a more general method for removing residual misalignments after common-offset depth migration, and can be used independently of the first portion of the method of the present invention.

Figure 3:
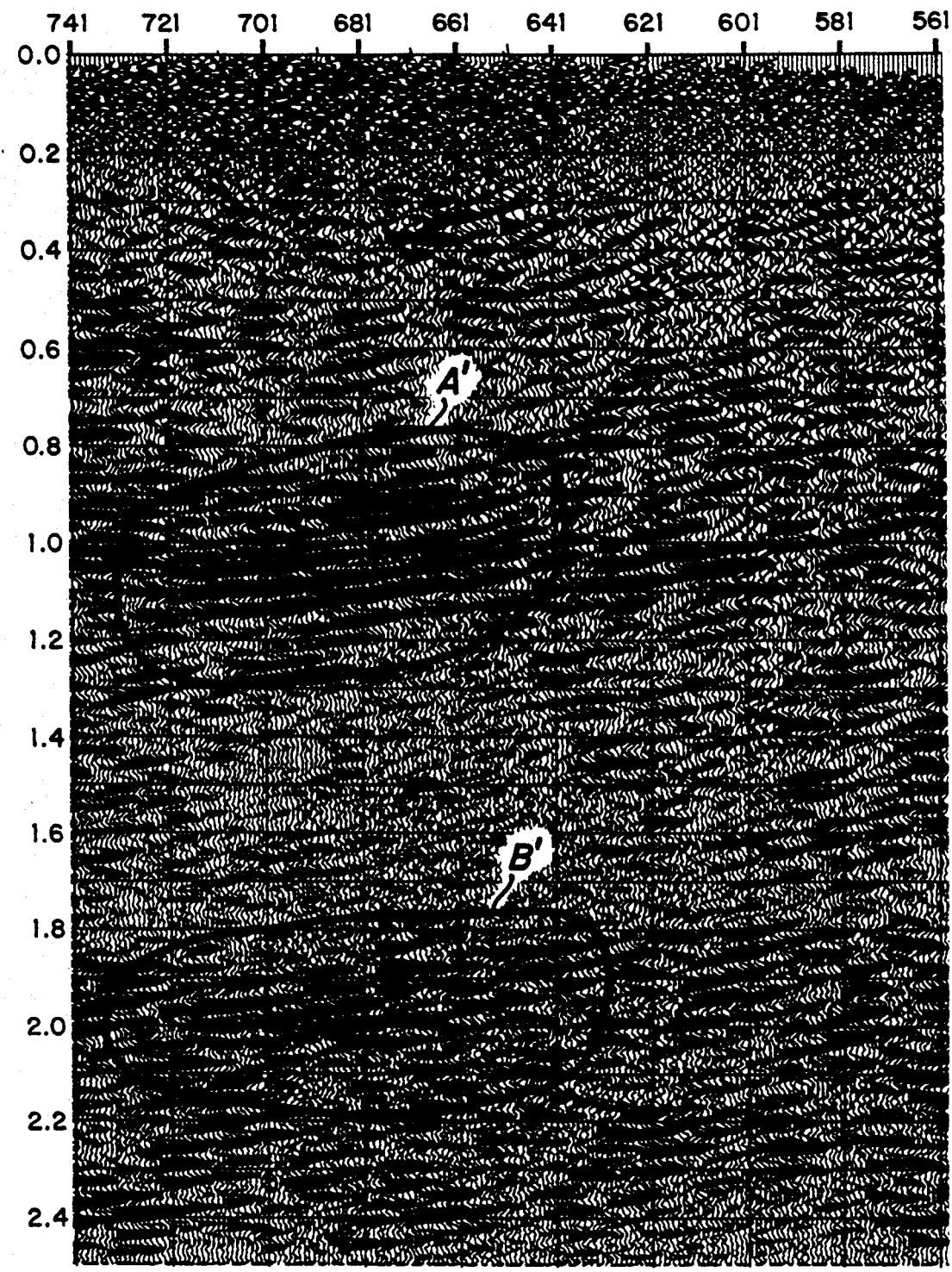
FIG. 3 is a seismogram illustrating the same data as that of FIG. 2 after being processed in accordance with the method of the present invention.

At block 51 the processed data may be displayed. FIG. 3 illustrates the data of the migrated depth section of FIG. 2 after the method of the present invention has been applied.

The three step method proposed by the present invention has been described and illustrated. First, after calculating an approximate high-frequency static correction to the individual shots and receivers (using traditional automatic methods), depth migration iterations were employed to coarsely tune the near surface velocity layer. Second, tomography was employed to better tune this layer and to account for buried anomalies. Then, third, any residual misalignments were addressed using a multi-windowed statics adjustment within the common image point gathers.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of deriving statics corrections from seismic data including common reflection point gathers and both migrated and unmigrated traces comprising the steps of:
   receiving seismic data as a first gather having traces including a conventional static solution having frequency variations;
   filtering said conventional statics solution for source and receiver to remove all but the highest frequency variations;
   applying said highest frequency variations to unmigrated traces in a second gather;
   performing a depth migration using a uniform weathering velocity on said unmigrated traces with said highest frequency variations applied to provide second migrated traces in said second gather;
   calculating an initial stacking power of each gather by stacking all said second migrated traces in said second gather;
   recording source and receiver locations of each said second migrated trace on a source list and receiver list;
   sorting said source list and said receiver list in order;
   selecting a predetermined source location for further processing;
   changing said uniform weathering velocity of said predetermined source incrementally by dv;
   combining said stacking power of all said second gathers to provide a total stacking power; and
   choosing a velocity increment dv to maximize said total stacking power.

2. The method according to claim 1 also including the steps of:
   selecting a second predetermined source location for further processing;
   changing said uniform weathering velocity of said second predetermined source incrementally by dv;
   combining said stacking power of all said second gathers to provide a second total stacking power; and
   choosing a velocity increment dv to maximize said second total stacking power.

3. The method according to claim 2 also including the steps of:
   selecting a predetermined receiver location for further processing;
   changing said uniform weathering velocity of said predetermined receiver incrementally by dv;
   combining said stacking power of all said second gathers to provide a third total stacking power; and
   choosing a velocity increment dv to maximize said third total stacking power.

4. The method according to claim 3 also including the steps of:
   selecting a second predetermined receiver location for further processing;
   changing said uniform weathering velocity of said second predetermined receiver incrementally by dv;
   combining said stacking power of all said second gathers to provide a fourth total stacking power; and
   choosing a velocity increment dv to maximize said fourth total stacking power.

5. The method according to claim 4 also including the step of:
   averaging and grading said weathering velocities to yield a single velocity profile having a new weathering velocity.

6. The method according to claim 5 also including the step of:
   migrating said unmigrated traces using said new weathering velocity.

7. The method according to claim 6 also including the step of:
   sorting the results of common offset depth migration into common image point (CIP) gathers.

8. The method according to claim 7 also including the step of:
   handling each common image point gather as a common depth point (CDP) gather.

9. The method according to claim 8 also including the step of:
   using a basement-consistent multi-windowed statics program to derive a set of adjustments optimizing event line-ups.

10. The method according to claim 9 also including the step of:
    employing a preliminary hyperbolic correction whenever residual moveout prevents a predictable adaptive treatment.

11. A method of deriving statics corrections from seismic data including common reflection point gathers and both migrated and unmigrated traces comprising the steps of:
    receiving seismic data as a first gather having traces including a conventional static solution having frequency variations;
    filtering said conventional statics solution for source and receiver to remove all but the highest frequency variations;
    applying said highest frequency variations to unmigrated traces in a second gather;
    performing a depth migration using a uniform weathering velocity on said unmigrated traces with said highest frequency variations applied to provide second migrated traces in said second gather;
    calculating an initial stacking power of each gather by stacking all said second migrated traces in said second gather;
    recording source and receiver locations of each said second migrated trace on a source list and receiver list;
    sorting said source list and said receiver list in order;

selecting a predetermined source location for further processing;
changing said uniform weathering velocity of said predetermined source incrementally by dv;
combining said stacking power of all said second gathers to provide a total stacking power;
choosing a velocity increment dv to maximize said total stacking power;
selecting a second predetermined source location for further processing;
changing said uniform weathering velocity of said second predetermined source incrementally by dv;
combining said stacking power of all said second gathers to provide a second total stacking power;
choosing a velocity increment dv to maximize said second total stacking power;
selecting a predetermined receiver location for further processing;
changing said uniform weathering velocity of said predetermined receiver incrementally by dv;
combining said stacking power of all said second gathers to provide a third total stacking power;
choosing a velocity increment dv to maximize said third total stacking power;
selecting a second predetermined receiver location for further processing;
changing said uniform weathering velocity of said second predetermined receiver incrementally by dv;
combining said stacking power of all said second gathers to provide a fourth total stacking power;
choosing a velocity increment dv to maximize said fourth total stacking power;
averaging and grading said weathering velocities incremented by dv to yield a single velocity profile having a new weathering velocity;
migrating said unmigrated traces using said new weathering velocity.

12. An apparatus for deriving statics corrections from seismic data including common reflection point gathers and both migrated and unmigrated traces comprising:
input means for receiving seismic data as a first gather having traces including a conventional static solution having frequency variations;
filtering means for filtering said conventional statics solution for source and receiver to remove all but the highest frequency variations;
applying means for applying said highest frequency variations to unmigrated traces in a second gather;
means for performing a depth migration using a uniform weathering velocity on said unmigrated traces with said highest frequency variations applied to provide second migrated traces in said second gather;
calculating means for calculating an initial stacking power of each gather by stacking all said second migrated traces in said second gather;
recording means for recording source and receiver locations of each said second migrated trace on a source list and receiver list;
sorting means for sorting said source list and said receiver list in order;
selection means for selecting a predetermined source location for further processing;
change means for changing said uniform weathering velocity of said predetermined source incrementally by dv;
combining means for combining said stacking power of all said second gathers to provide a total stacking power; and
means for choosing a velocity increment dv to maximize said total stacking power.

13. The apparatus according to claim 12 also including:
second selection means for selecting a second predetermined source location for further processing;
second change means for changing said uniform weathering velocity of said second predetermined source incrementally by dv;
second combining means for combining said stacking power of all said second gathers to provide a second total stacking power; and
second means for choosing a velocity increment dv to maximize said second total stacking power.

14. The method according to claim 13 also including the steps of:
receiver selection means for selecting a predetermined receiver location for further processing;
receiver change means for changing said uniform weathering velocity of said predetermined receiver incrementally by dv;
receiver combining means for combining said stacking power of all said second gathers to provide a third total stacking power; and
receiver means for choosing a velocity increment dv to maximize said third total stacking power.

15. The apparatus according to claim 14 also including:
second receiver selection means for selecting a second predetermined receiver location for further processing;
second receiver change means for changing said uniform weathering velocity of said second predetermined receiver incrementally by dv;
second receiver combining means for combining said stacking power of all said second gathers to provide a fourth total stacking power; and
second receiver means for choosing a velocity increment dv to maximize said fourth total stacking power.

16. The apparatus according to claim 15 also including:
averaging means for averaging and grading said weathering velocities to yield a single velocity profile having a new weathering velocity.

17. The apparatus according to claim 16 also including:
migrating means for migrating said unmigrated traces using said new weathering velocity.

18. The apparatus according to claim 17 also including:
sorting means for sorting the results of common offset depth migration into common image point (CIP) gathers.

19. The apparatus according to claim 18 also including:
means for treating each common image point gather as a common depth point (CDP) gather.

20. The apparatus according to claim 19 also including:
means for using a statics program to derive a set of adjustments to maximize event line-ups.

* * * * *